United States Patent
Zilbershtein et al.

(10) Patent No.: US 7,940,793 B2
(45) Date of Patent: May 10, 2011

(54) MEDIA APPLICATION

(75) Inventors: Itai Ephraim Zilbershtein, Hod-Hasharon (IL); Zvika Perry, Tel-Aviv (IL); Yaron Pdut, Kfar-Saba (IL); Gordon R. Brunson, Broomfield, CO (US)

(73) Assignee: Avaya Communication Israel Ltd, Tel Aviv (IL)

( * ) Notice: Subject to any disclaimer, the term of this patent is extended or adjusted under 35 U.S.C. 154(b) by 712 days.

(21) Appl. No.: 11/739,378

(22) Filed: Apr. 24, 2007

(65) Prior Publication Data
US 2008/0270457 A1 Oct. 30, 2008

(51) Int. Cl.
*H04L 12/42* (2006.01)

(52) U.S. Cl. ............... 370/466; 379/93.15; 379/100.13; 379/142.14

(58) Field of Classification Search ............... 709/204; 379/93.08, 93.15, 100.13, 142.14; 370/466
See application file for complete search history.

(56) References Cited

U.S. PATENT DOCUMENTS

| | | | | |
|---|---|---|---|---|
| 5,311,576 A * | 5/1994 | Brunson et al. | ............ | 379/88.26 |
| 6,038,296 A * | 3/2000 | Brunson et al. | ............ | 379/100.11 |
| 6,337,858 B1 * | 1/2002 | Petty et al. | ............ | 370/356 |
| 6,728,357 B2 * | 4/2004 | O'Neal et al. | ............ | 379/201.04 |
| 6,763,226 B1 * | 7/2004 | McZeal, Jr. | ............ | 455/90.2 |
| 6,996,211 B2 * | 2/2006 | Reynolds et al. | ............ | 379/88.21 |
| 7,099,914 B1 | 8/2006 | Hartmann et al. | | |
| 7,443,879 B2 * | 10/2008 | Ejzak et al. | ............ | 370/465 |
| 7,477,638 B1 * | 1/2009 | Kumar et al. | ............ | 370/356 |
| 7,483,414 B2 * | 1/2009 | Grove et al. | ............ | 370/352 |
| 7,502,993 B1 * | 3/2009 | Dodrill et al. | ............ | 715/205 |
| 7,573,987 B1 * | 8/2009 | Block et al. | ............ | 379/88.13 |
| 7,751,316 B2 * | 7/2010 | Yarlagadda et al. | ............ | 370/230 |
| 2003/0145054 A1 | 7/2003 | Dyke | | |
| 2005/0022255 A1 * | 1/2005 | Oh | ............ | 725/143 |
| 2005/0157708 A1 * | 7/2005 | Chun | ............ | 370/356 |
| 2006/0101116 A1 * | 5/2006 | Rittman et al. | ............ | 709/204 |
| 2006/0256816 A1 * | 11/2006 | Yarlagadda et al. | ............ | 370/466 |
| 2007/0076594 A1 | 4/2007 | Khan et al. | | |
| 2009/0034700 A1 * | 2/2009 | Brunson et al. | ............ | 379/93.01 |

OTHER PUBLICATIONS

Rosenberg et al., "An Offer/Answer Model with the Session Description Protocol (SDP)", "Network Working Group Standards Track rfc3264.txt", Jun. 1, 2002, No. 003, Publisher: The Internet Society; Internet Engineering Task Force.
Krause, Sven, "EP Application No. 08002075.3—1244 Extended European Search Report Feb. 10, 2009", Publisher: EPO, Published in: EP.
Kraus, Sven, "EP Application No. 08002075.3-1244 Partial European Search Report Jun. 11, 2008", Publisher: EPO, Published in: EP.
Kaplan et al., "Session Description Protocol (SDP) Offer/Answer Negotiation For Best-Effort Secure Real-Time Transport Protocol", "MMusic Working Group Internet Draft", Oct. 2006, Publisher: Internet Engineering Task Force (IETF).
"EP Application No. 08002075.3-1244/ 1986408 Office Action Sep. 8, 2009", Publisher: EPO, Published in: EP.

* cited by examiner

*Primary Examiner* — Krisna Lim
(74) *Attorney, Agent, or Firm* — Joseph B. Ryan; Jason Paul DeMont; Wayne S. Breyer

(57) ABSTRACT

A media application server, comprising a network interface and a processor adapted to establish voice connections with opposite end devices and to perform on the connections at least one media application task for signals of a plurality of different signal formats, the processor being adapted to establish the connection in a negotiation procedure in which it advertises itself as supporting fewer than the plurality of signal formats.

7 Claims, 1 Drawing Sheet

MEDIA APPLICATION

FIELD OF THE INVENTION

The present invention relates to communication apparatus and particularly to media applications.

BACKGROUND OF THE INVENTION

Telephone and other voice services in IP networks use a plurality of different protocols, referred to as CODECs, which differ in their compromise between compression ratio and quality. For example, in the G.711 codec, voice signals are not compressed at all, while in the G.729 codec, the data signals are compressed in a manner which reduces their quality.

End user devices implementing voice services include telephone sets and media applications, such as voice mail and auto attendant. Different end user devices were designed to use different codecs. At the time of setting up a connection, the opposite end devices participating in the call may exchange lists of codecs which they support to determine a codec which they both support to be used in the connection.

US patent publication 2004/024399, assigned to Nokia corporation and published Dec. 2, 2004, the disclosure of which is incorporated herein by reference, describes a transcoding arrangement in which a session description protocol SDP is used to provide lists of supported codecs.

Similar procedures are described in PCT publication WO02/096040, titled "Communication of Information", and published Nov. 28, 2002, the disclosure of which is incorporated herein by reference.

In some cases, however, there is no codec that is supported by both the end devices participating in the connection. Therefore, switches (e.g., PBX) that translate signals between different codecs were designed. For example, in order to allow a telephone supporting the G.711 codec to communicate with a telephone supporting the G.729 codec, a switch along the network connecting the telephone translates the signals exchanged between them.

US patent publication 2005/0157708 to Chun, published Jul. 21, 2005, the disclosure of which is incorporated herein by reference, describes a system in which a PBX performs codec translation for a voice mail server.

In addition to providing switches that perform codec translations, manufacturers have provided end user devices that do not support only a single codec, but rather support a large span of codecs. For example, media applications were produced with an additional digital signal processor (DSP) that performs signal translation to a codec used by the main processing unit of the media application. The addition of another DSP for each media application is costly and therefore there have been several suggestions on methods to reduce the cost of the codec translation DSP.

US patent publication 2005/0022255, to Oh, the disclosure of which is incorporated herein by reference, describes a mobile communication terminal which has a main processor and a sub-processor and which distributes codec tasks between them.

U.S. Pat. No. 5,509,009 to Laycock et al., dated Apr. 16, 1996, the disclosure of which is incorporated herein by reference, describes a codec sub-system shared between a plurality of end user devices. Use of such a sub-system reduces the cost of DSPs for the media applications.

SUMMARY OF THE INVENTION

An aspect of some embodiments of the present invention relates to a media application adapted to perform its tasks on real time telephone connections in accordance with a plurality of different codecs and which is adapted to advertise that it supports fewer than all the formats it supports, optionally only a single codec, when establishing a connection.

An aspect of some embodiments of the present invention relates to a media application server configurable to operate in accordance with a plurality of different codecs (or other signal formats), but does not support codec translation. According to its configuration, the media application server advertises at the setup of connections, for example using the session description protocol (SDP), a single codec that it supports, forcing clients to transmit to it signals in accordance with the configured codec or have a switch along the network path to the clients convert the signals to the advertised codec. Thus, the media application server provides the configurability of working in accordance with a plurality of codecs, without requiring the hardware of a codec translator.

In some embodiments of the invention, the media application server is located in a single housing with a PBX switch, which performs codec transcoding, such that there is no danger that a client will not be able to be serviced due to a mismatch of codecs.

An aspect of some embodiments of the present invention relates to a switch, such as a private branch exchange (PBX) including a slave processor adapted to perform codec translation tasks and a switch control application and a media application running on one or more other processors. The switch control application is adapted to control tasks of the slave processor, while the media application is not adapted to control any tasks of the slave processor.

Optionally, the media application is adapted to operate in accordance with a plurality of different codecs, although it does not control the slave processor to perform codec translation tasks.

An aspect of some embodiments of the present invention relates to a media application adapted to identify to different connections as supporting different groups of one or more signal formats, not due to a change in the capabilities of the media application.

In some embodiments of the invention, the media application changes the group of formats that it advertises as being supported at the time of establishing connections, due to user configuration of the signal format that the media application is to use. Alternatively or additionally, the media application selects the group of formats that it advertises as supported responsive to the mail box to which the connection is connecting. Further alternatively or additionally, the media application selects the group of formats that it advertises as supported responsive to the formats advertised by the opposite end device of the connection.

An aspect of some embodiments of the present invention relates to a media application adapted to establish connections between two of its ports through at least one switch. Optionally, in establishing the connections, the two ports identify themselves as supporting different codecs, such that the switch transcodes the signals transmitted between the ports.

There is therefore provided in accordance with an exemplary embodiment of the invention, a media application server, comprising a network interface and a processor adapted to establish voice connections with opposite end devices and to perform on the connections at least one media application task for signals of a plurality of different signal formats, the processor being adapted to establish the connection in a negotiation procedure in which it advertises itself as supporting fewer than the plurality of signal formats.

Optionally, the processor is adapted to advertise itself as supporting only a single signal format in negotiation procedures for establishing a connection. Optionally, the processor is adapted to advertise itself as supporting signal formats configured by a human. Optionally, the processor is adapted to perform, on connections it handles, a task of storing samples in a voice mail box. Optionally, the processor is adapted to enforce different maximal message lengths for different signal formats. Optionally, the processor is adapted to store an indication of the format of signals it stores along with the stored signals.

There is further provided in accordance with an exemplary embodiment of the invention, a method of operating a media application, comprising establishing a first real time voice connection between the media application and an opposite end device, in which the media application identifies itself as supporting only a first signal format, handling, by the media application, signals received on the first connection in accordance with the first signal format, so as to perform on the first connection a media application task, establishing a second real time voice connection between the media application and an opposite end device, in which the media application identifies itself as supporting only a second, different, signal format and handling, by the media application, signals received on the second connection in accordance with the second signal format, so as to perform on the second connection a media application task.

Optionally, establishing the first and second connections are performed during the same day. Optionally, the second connection is established after the first connection is terminated. Optionally, the media application uses a same software not being updated in establishing both the first and second connections. Optionally, the first signal format is a compressed format and the second signal format is an uncompressed format. Alternatively or additionally, the first signal format is an encrypted format and the second signal format is an unencrypted format.

Optionally, the method includes transcoding the signals of the first connection between the first signal format and a format of the opposite end device, by a switch not controlled by the media application. Optionally, the signal format that the media application advertises as supporting is selected responsive to a voice mail box to which the connection is connected.

There is further provided in accordance with an exemplary embodiment of the invention, a media application server, comprising a network interface, a configuration interface adapted to receive from a human an indication of a signal format according to which the server is to operate and a processor adapted to establish real time voice connections with opposite end devices and to perform on the connections at least one media application task for signals of a plurality of different signal formats, the specific signal format used in each specific connection being at least partially selected responsive to an indication from the configuration interface, and being carried out by the processor without performing translation between different signal formats.

Optionally, the network interface connects to an external communication link through a switch. Optionally, the processor adapted to perform the at least one media application task is additionally adapted to perform a switch control application task of the switch. Optionally, the processor is adapted to perform the at least one media application task differently for different signal formats.

Optionally, the processor is adapted to enforce different maximal message lengths for different signal formats. Optionally, the processor is adapted to store an indication of the format of signals it stores along with the stored signals. Optionally, the processor is adapted to identify to an opposite end device with which it communicates, the signal format according to which it operates. Optionally, the processor is adapted to perform at least one media application task for signals in accordance with a plurality of different signal formats. In some embodiments of the invention, the processor is adapted to indicate to opposite end devices with which it communicates only a single signal format that it supports.

There is further provided in accordance with an exemplary embodiment of the invention, a private box exchange, comprising a switch adapted to set up real time voice connections, a media application server adapted to manage voice mail boxes for voice connections set up by the switch and a translation processor adapted to transcode signals passing on connections set up by the switch between two different signal formats, under control of the switch, without being controlled by the media application server.

Optionally, the switch is adapted to redirect real time voice connections. Optionally, the media application controller comprises a software running on a processor which additionally hosts a controller of the switch.

There is further provided in accordance with an exemplary embodiment of the invention, a method of translating voice signals between two different formats, comprising establishing a connection between two ports of a network device, exchanging connection setup signals on the connection, in which one of the ports identifies as supporting a first signal format and the second port identifies as supporting a second signal format and transmitting voice signals between the ports, such that they undergo signal format conversion along the connection.

Optionally, the signal format conversion comprises changing the codec of the voice signals.

BRIEF DESCRIPTION OF THE DRAWING

The present invention will now be described in the following detailed description of exemplary embodiments of the invention and with reference to the attached drawing, in which dimensions of components and features shown are chosen for convenience and clarity of presentation and are not necessarily shown to scale. Generally, only structures, elements or parts that are germane to the discussion are shown in the figure.

DETAILED DESCRIPTION OF SOME EMBODIMENTS

Figure 1:
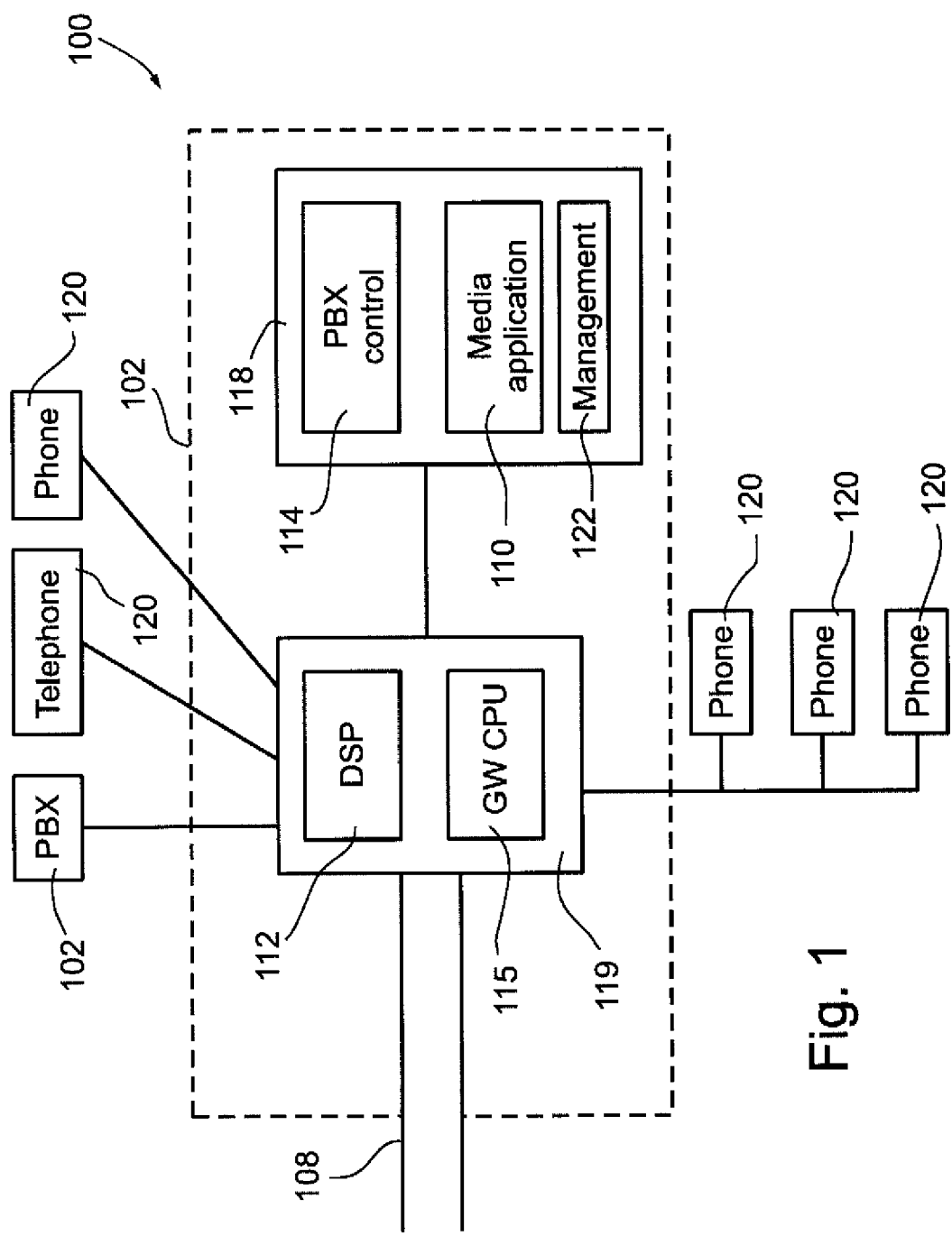
FIG. 1 is a schematic illustration of a media application in a communication network, in accordance with an exemplary embodiment of the present invention.

FIG. 1 is a schematic illustration of a communication network 100 including a private branch exchange (PBX) 102, in accordance with an exemplary embodiment of the present invention. Network 100 includes a plurality of telephones 120 connected through a PBX 102 to an external network (not shown), through a trunk 108, such as a T1 or E1 line. PBX 102 may also be connected to one or more other switches 102 and/or to other end user devices (e.g., computers). Telephones 120 may include analog telephones, digital telephones, VoIP telephones and/or any other types of telephones.

PBX 102 provides switching services, which are provided by a gateway 119, which includes, for example, a slave processor, such as a DSP 112, and a gateway CPU 115. It is noted, however, that gateway 119 may also be implemented by a slave processor alone, without CPU 115. Gateway 119 optionally operates under control of a switch controller 114. The switching services optionally include setting up calls, redirection of calls and/or directing gateway 119 to perform call translations between different codecs, as is known in the art.

In some embodiments of the invention, in addition to performing switching tasks, PBX 102 includes a media application 110. In an exemplary embodiment of the invention, media application 110 is adapted to operate in accordance with a plurality of different codecs.

Although media application 110 is adapted to operate in accordance with a plurality of different codecs, it does not perform codec translation and does not provide instructions to DSP 112, or any other slave processor, to perform codec translation. Rather, media application 110 merely advertises at the beginning of each connection, for example using the session description protocol (SDP), that it only supports the specific codec that it was configured to use, by a system manager or user. Thus, media application 110 forces the opposite end client device with which it is communicating on the connection to adopt to its codec or, if the opposite end client device does not support the codec advertised by media application 110, causes a switch along the communication connection path to translate the signals between the codecs used by media application 110 and the other end client device. It is noted that the switch that translates the signals of the connection between the different codecs may be switch 102, by DSP 112 and under control of switch controller 114. It is noted, however, that media application 110 does not control the codec translation directly or indirectly. That is, media application 110 does not instruct DSP 112 or switch controller 114 on any aspects of the codec translation to be performed.

In addition to other benefits, by having media application 110 not deal with codec translations at all, software and/or version updates of switch 102, regarding translation operations, are simpler, as only PBX control 114 needs to be updated when new hardware or software releases are provided by the manufacturer or when new codecs are defined. Optionally, the codec which governs its operation, determines the rate at which media application 110 stores voice samples into its memory and/or retrieves voice samples from the memory. Alternatively or additionally, media application 110 is configured to assign different operation parameter constants according to the codecs governing its operation. For example, a constant indicating the maximal length of a recorded message may be assigned a different value for different codecs. Alternatively or additionally, a value indicating a maximal total amount of time of stored messages may be different for different codecs, because of the different size of voice samples of same duration for the different codecs.

In some embodiments of the invention, media application 110 is adapted to store with each recorded message and/or for each voice mail box an indication of the type of the codec of the message or mail box. In an exemplary embodiment of the invention, media application 110 is adapted to email voice messages it stores along with an indication of the format of the stored message, so that the receiver of the email knows which codec is to be used in decoding the voice message.

In some embodiments of the invention, media application 110 stores a plurality of versions of one or more control messages in accordance with a plurality of respective codecs and in operation provides the version of the codec according to which it is currently operating. Alternatively or additionally, before transmitting each response, media application notifies the opposite end device of the format of the transmitted message and identifies itself as supporting only that format.

Alternatively or additionally, when media application 110 needs to translate a message from one format to another, media application 110 establishes a connection between two of its ports through gateway 119. The transmitting port identifies in establishing the connection as supporting the source format of the translated message and the receiving port identifies as supporting the desired translated format of the message. Such a connection between two ports of media application 110 (referred to herein as a translation connection) may be established to translate a single message. Possibly, the translation connection is established in order to translate a specific message for a specific connection (referred to herein as "the client connection") currently handled by media application 110. In some embodiments of the invention, the translation connection is established after the client connection is established and the translated result of the translation connection is used by the client connection while it is still established. Alternatively to performing the translation for a connection currently handled by media application 110, a translation connection may be established for other purposes, possibly for non-real time tasks. The translation connection may operate at substantially any suitable transmission rate, optionally also at rates above the rate of a connection for which the translation is performed.

In other embodiments of the invention, a translation connection is established to translate a plurality of messages. Possibly, a translation connection is established without relation to any specific client connection.

The translation between different signal formats using a translation codec may optionally be performed by other network devices including, end computers, switches and gateways.

Media application 110 optionally has a management unit 122 adapted to receive operation settings from a system manager of network 100 and/or from users of telephones 120. Optionally, management unit 122 is adapted to receive an indication of the codec which is to be used by media application 110 in operation. For example, the indication may state whether a codec with or without compression is to be used and/or the level of compression to be used. Alternatively or additionally, the indication indicates whether the signals stored by media application 110 are to be stored encrypted.

In some embodiments of the invention, the codec, compression and/or encryption settings of media application 110 apply to all voice mail boxes managed by the media application, for simplicity. Alternatively, each mail box of media application 110 may have a separate codec setting which governs its operation.

In some embodiments of the invention, media application 110 comprises a voice mail server. Alternatively or additionally, media application 110 comprises an auto-attendant. Optionally, media application 110 is adapted to sound one or more messages to callers to a telephone number and record messages of the callers. In some embodiments of the invention, media application 110 is adapted to store a plurality of messages for a single telephone number and to select a message to be sounded according to caller selection, time of day, telephone number of caller and/or any other selection method known in the art. In some embodiments of the invention, media application 110 is adapted to manage classifications of recorded messages, such as whether they are business related or private and/or a priority of the message. In some embodiments of the invention, media application 110 is adapted play a menu of options and/or to direct incoming calls to other extensions responsive to caller instructions. Optionally, media application 110 is adapted to forward messages it records to other telephone numbers. In some embodiments of the invention, media application 110 is adapted to identify and forward fax and/or modem calls.

In some embodiments of the invention, media application 110 and switch controller 114 are software processes operating on a single processor 118. Alternatively, media application 110 and switch controller 114 are implemented in software on separate processors, or are implemented in separate hardware or firmware, possibly within a single casing. Further alternatively, media application 110 is external to PBX 102 located in a separate casing and optionally in a different room. In some embodiments of the invention, media application 110 is distanced from PBX 102 by at least 10 or even at least 50 meters and is optionally connected to PBX 102 through a telephone line. Alternatively or additionally, media application 110 is connected to PBX 102 through a packet based network, for example using a VoIP (voice over IP) connection or any other data communication link, such as used in LANs.

While the above description relates to codec translations, the method of the present invention may be used for other translation tasks between different signal formats. For example, media application 110 may be configurable to operate according to a plurality of compression operation options (e.g., use compression A, use compression B, no compression) and/or encryption options, while not performing or controlling any compression or encryption tasks. Instead, media application 110 advertises the encryption and/or compression option it is configured to use, trusting a switch along the connection to perform the required translation.

Furthermore, while the procedure of identifying as supporting only a single codec or signal format is suggested as being used by media applications 110 not having the capability to perform translations, this procedure may be used also by media applications having the capability to perform signal translations, for example to reduce their load. For example, a media application 110 may have a small processor adapted to perform codec or other translations only for a limited number of connections. When the small processor has room for additional connections, media application 110 identifies as supporting a plurality of different codecs in setting up the connection. When, however, the small processor of media application 110 is completely booked, media application 110 establishes additional connections identifying as supporting only a single signal format, so that the translation between formats, if necessary, will be carried out by a switch separate from the media application.

Alternatively or additionally, a processor of media application 110 is adapted to perform only some types of signal conversions, and if other conversions are required, media application 110 identifies as not supporting the signal formats of the other end device, so that the conversion will be performed by a switch along the path of the signals. For example, the processor of media application 110 may be configured to perform translations between formats (A,B) and (B,C) but not (A,C). When media application 110 is configured to operate according to format C, if the opposite end device identifies as supporting format B, media application 110 identifies as supporting format B and performs the conversion internally. If, on the other hand, the opposite end device identifies as supporting format A, media application 110 identifies as supporting format C, thus forcing the conversion to be performed by the switch.

It will be appreciated that the above described apparatus may be varied in many ways, including, changing the layouts, materials, elements and structures used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method comprising:
   establishing a first voice connection between a first calling device and a first called device, wherein a server establishes the first voice connection using a first codec of a first type after identifying itself as supporting (i) only the first type of codec and (ii) no codec translation; and
   establishing a second voice connection between a second calling device and a second called device, wherein the server establishes the second voice connection using a second codec of a second type after identifying itself as supporting (i) only the second type of codec and (ii) no codec translation;
   wherein the first type of codec is associated with a first signal format, and
   wherein the second type of codec is associated with a second signal format that is different than the first signal format, and
   wherein, when each of the first voice connection and the second voice connection is to be established, identifying itself as supporting only one type of codec and no codec translation relieves the server of the burden of performing codec translation.

2. The method of claim 1, wherein the second voice connection is established after the first voice connection is terminated.

3. The method of claim 1, wherein the server comprises software that supports the first voice connection and the second voice connection.

4. The method of claim 1, wherein the first signal format is a compressed format and the second signal format is an uncompressed format.

5. The method of claim 1, wherein the first signal format is an encrypted format and the second signal format is an unencrypted format.

6. The method of claim 1, wherein the first voice connection comprises a voice mail application.

7. A method comprising:
   receiving by a server a connection message from a first device seeking a first voice connection with a second device that is connected to the server;

responding to the first device with an indication that the server supports only a first type of codec;

establishing the first voice connection between the first device and the second device by using a first codec of the first type of codec;

receiving by the server a connection message from a third device seeking a second voice connection with a fourth device that is connected to the server;

responding to the third device with an indication that the server supports only a second type of codec; and establishing the second voice connection between the third device and the fourth device by using a second codec of the second type of codec;

wherein the first type of codec is associated with a first signal format, and wherein the second type of codec is associated with a second signal format that is different than the first signal format, wherein, when the first voice connection is to be established, responding with the indication that the server supports only the first type of codec relieves the server of the burden of translating between the first signal format and a different signal format that is associated with the first device, and wherein, when the second voice connection is be established, responding with the indication that the server supports only the second type of codec relieves the server of the burden of translating between the second signal format and a different signal format that is associated with the third device.

* * * * *